United States Patent [19]

Capriotti

[11] Patent Number: 4,620,602
[45] Date of Patent: Nov. 4, 1986

[54] TRACK DRIVE CONVERTER

[76] Inventor: Allen Capriotti, 217 High St., Glendon Heights, Easton, Pa. 18042

[21] Appl. No.: 752,459

[22] Filed: Jul. 1, 1985

[51] Int. Cl.$^4$ .................. B62D 55/04; B62D 55/30
[52] U.S. Cl. .................. 180/9.21; 180/9.26; 180/9.62; 280/28.5; 301/44 T; 301/63 DS; 305/57
[58] Field of Search .................. 180/9.21, 9.26, 9.28, 180/9.3, 9.5, 9.52, 9.54, 9.62; 305/10, 39, 40, 56, 57; 301/40 R, 40 S, 41 R, 44 T, 47, 49, 63 DS; 280/28.5; 474/164

[56] References Cited

U.S. PATENT DOCUMENTS

| | | | |
|---|---|---|---|
| 1,558,432 | 10/1925 | Wilson | 180/9.28 |
| 2,986,190 | 5/1961 | Lamb | 301/47 |
| 3,207,562 | 9/1965 | Ewing | 301/47 |
| 3,447,620 | 6/1969 | Schoonover | 180/9.52 |
| 3,467,446 | 9/1969 | Seelbach | 305/57 |
| 3,717,214 | 2/1973 | Schoonover | 180/9.5 |

*Primary Examiner*—John J. Love
*Assistant Examiner*—Everett G. Diederiks, Jr.
*Attorney, Agent, or Firm*—Ruth Moyerman

[57] ABSTRACT

A track drive converter for two or four wheel driven vehicles is disclosed. The converter has three interworking elements: a track, a wheel disc and a roller assembly. Each set of tires on a vehicle's side is overfitted with one track. Each wheel is fitted with two discs and each tire is provided with a roller assembly. The track is composed of padded links and connectors. The links are made of three parallel rods joined at their ends by an omega-shaped bracket. Also attached to the brackets are the connectors which are a series of three end-to-end, movably connected, bars. Each bar may move independently of its mates, allowing a set of links to compress along one edge and remain apart on their opposite edges. This compression provides the curvature in the track needed for turning. The track drive is provided by teeth on the link sets meshing with indents on the wheel disc. The track is tensioned by rollers positioned at each tire. The rollers, attached to hydraulic pistons, provide constant tension to the track. Because the pistons are provided with slidable brackets which ride in channels on the vehicle's underside, the rollers (through the pistons) provide constant pressure to the track as the wheels turn. Thus, using the vehicle's own steering assembly, a vehicle fitted with track, rollers and discs is converted from a wheel drive to a track drive vehicle.

12 Claims, 12 Drawing Figures

U.S. Patent  Nov. 4, 1986  Sheet 1 of 4  4,620,602
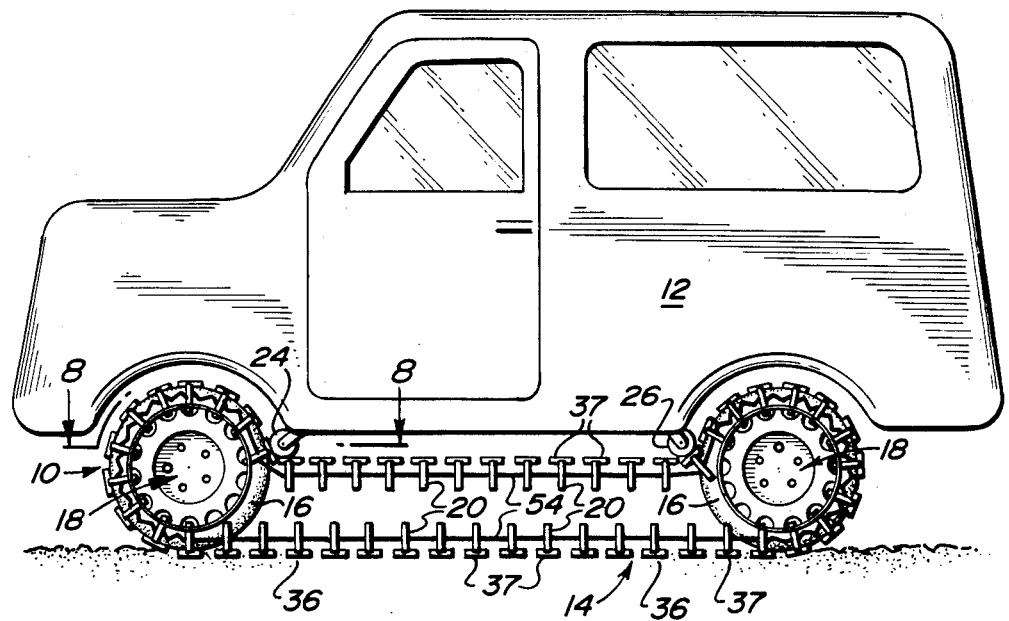
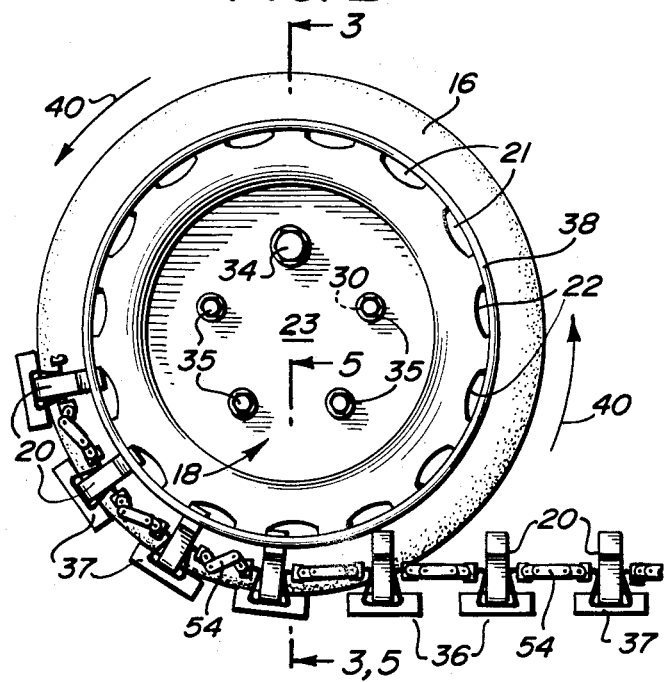
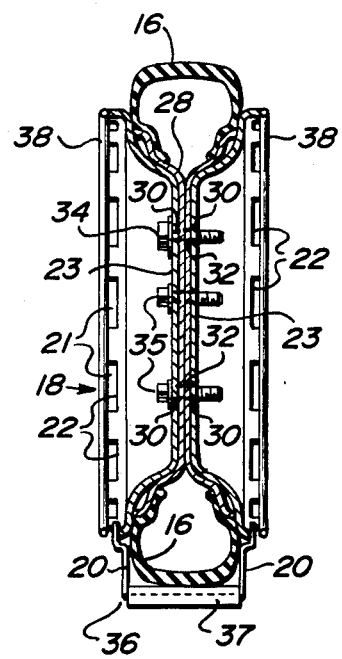

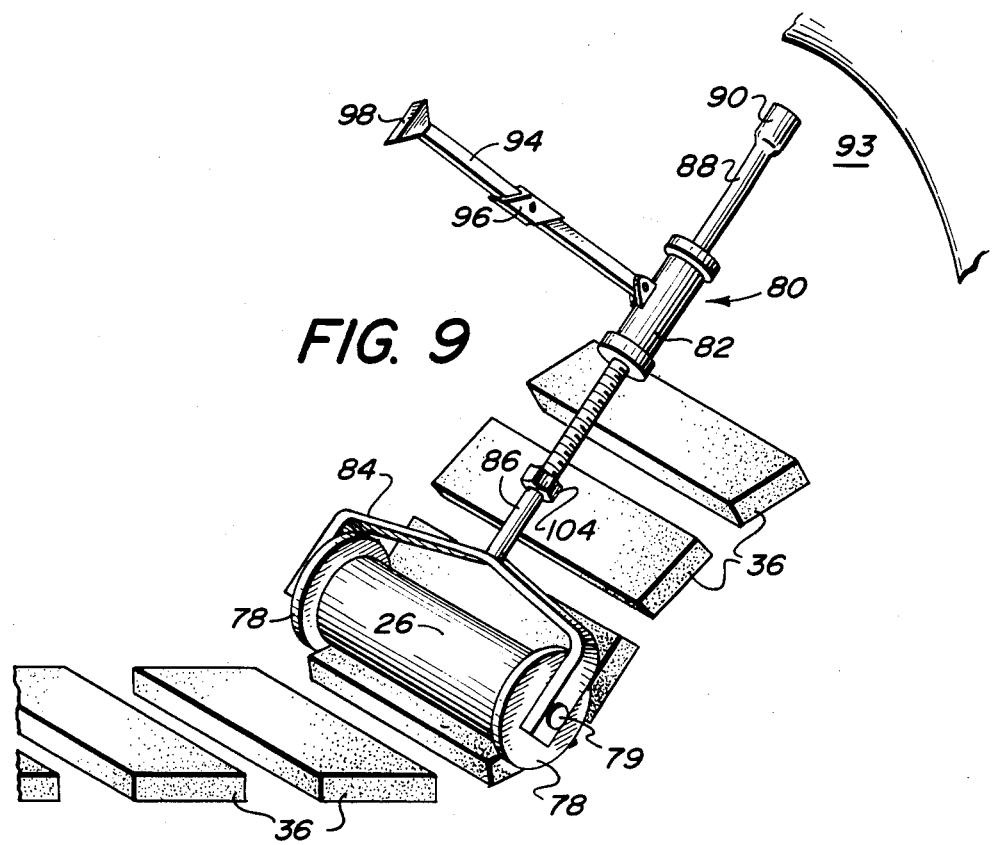
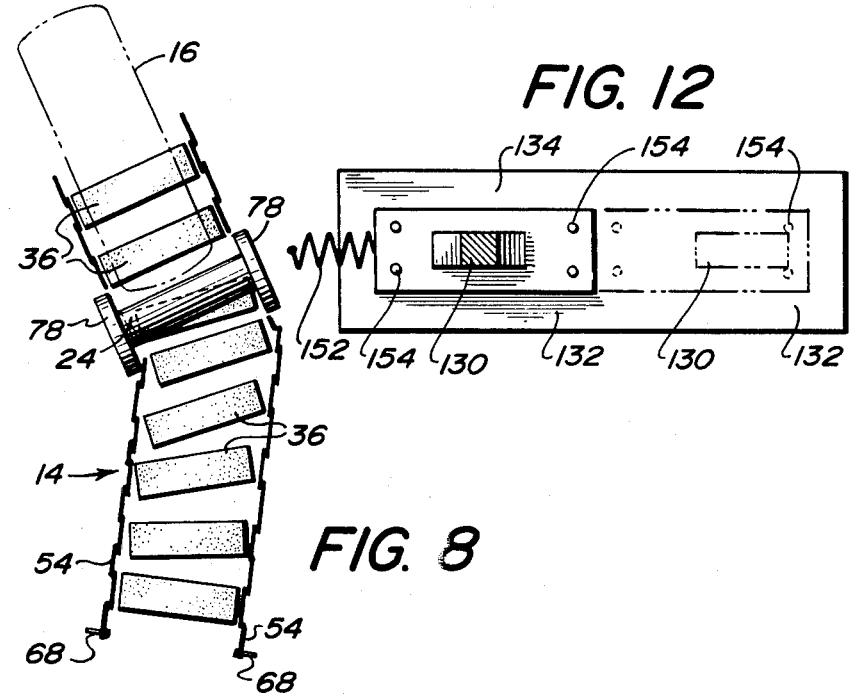

TRACK DRIVE CONVERTER

BACKGROUND OF THE INVENTION

1. Field of the Invention

This invention relates to motor vehicles, and more particularly to driving devices which convert a vehicle from wheel type to portable track drive.

2. Background of the Invention

Today there is a great demand for motor vehicles which are able to traverse uneven, boggy, sandy or other off-the-road surfaces. Hunters, fishermen and other sportsmen use such vehicles to advance their sport. Other persons use vehicles such as snowmobiles and jeeps for recreational purposes, as well as transportation when roads are inaccessable to the standard road car. These specialized vehicles are expensive and limited in use to their specialized purposes.

Transforming the standard road car, small truck, van or wagon to special use for off-road purposes has not gained wide usage. The apparatus necessary for such conversion is often cumbersome, expensive and permanent. An apparatus which could transform a road vehicle to a track drive vehicle would allow a consumer to purchase only one vehicle. A truly portable apparatus would allow a user to install and remove the tracks quickly and easily. Such a vehicle would be useful in emergency situations such as snow storms, flooded roads and boggy fields, etc., as well as for recreational purposes.

Presently, snowmobiles and jeep-like vehicles serve those recreational needs. However, there is a need for vehicles with better climbing stability, capable, for instance, of "crawling over logs".

There is a need for a safe vehicle for snow, one which will, because it has greater road surface area, brake more smoothly. There is a need for an apparatus which will not require oversize tires, thus saving expenses for the user.

There is also a need for a converter which will be useful, not only for the sportsman, but also in the military and in industries such as logging and farming.

There is, therefore, a great need for a truly portable track drive converter which is inexpensive, easy to operate, and which will be capable of use with a great variety of standard vehicles without requiring a great deal of equipment.

SUMMARY OF THE INVENTION

The aforementioned prior art problems are overcome by the track drive converter of this invention. The converter includes three main parts: (1) a pair of removable compressible tracks; (2) a set of wheel discs; and, (3) an assembly of tensioning rollers. The track is comprised of links and connectors. The links are preferably rubber coated to provide a lightweight portable track. Each link is comprised of three parallel rods. The ends of the rods are joined, preferably, to a perpendicular omega-shaped end bracket. Preferably also, each link end has a drive tooth set perpendicular to the rods and bracket, although teeth may be provided on only some links. The connectors are fastened to the ends of the omega-shaped bracket. Each connector comprises three end-to-end, movably connected, bars. Each bar, joined to its adjacent bar by pins, may move independently of its mates. Thus, link rods may be compressed on one link side and parallel on the other link side, allowing the track to form a curvature for turning.

The wheel discs are dish-shaped to conform with a vehicle's wheel configuration. One disc is fastened on each side of each wheel in parallel alignment, preferably by using the wheel's own lugs and a keyed or enlarged lug. The discs include, at their periphery, a series of indents spaced to receive the drive teeth on the track links. As the teeth and indents mesh, the vehicle becomes a track drive vehicle.

The tensioning roller assembly serves two purposes: It provides constant pressure to the track and keeps the track below the vehicle body line. The rollers are positioned, one in each wheel well above each tire and touching the track. Each roller is attached to, preferably, a hydraulic piston which provides constant pressure to the track, holding it on the tires. The rollers are wider than the track and are also lipped on their ends to hold the track in close juxtaposition to the tires. During a turn, the track links compress on one side and the entire track turns in the direction of the compression. Thus, a vehicle is changed from a wheel drive to a track drive vehicle.

It is therefore an object of this invention to provide a device which will convert a wheel drive vehicle to a track drive vehicle, but which is easily removed to allow reversion to the original wheel drive.

It is another object of this invention to provide the aforesaid track which is flexible and, therefore, easily steered.

It is still another object of this invention to provide a vehicle track drive which has greater traction than a wheel drive vehicle.

It is yet another object of this invention to provide a device which may be utilized with conventional tires.

It is a further object of this invention to provide a device which provides a track drive vehicle with more mobility than a wheel drive vehicle.

It is still a further object of this invention to provide a device which is easily installed on a standard wheel drive vehicle.

It is yet a further object of this invention to provide, as part of the device, a track which is truly portable, compressing to half its length for quick and easy removal and storage.

It is another object of this invention to provide a track which will store in an area no larger than that provided for a spare tire.

It is yet a further object of this invention to provide a device which will save fuel by creating greater surface contact of vehicle to surface, thus giving more workable horsepower to a vehicle.

It is another object of this invention to minimize wear and tear on a vehicle's suspension due to rolling action when a track crosses logs or rocks.

It is a further object of this invention to provide a device which will protect a vehicle's tires, covering them and reducing the tires' exposure to rough terrain.

It is still a further object of this invention to provide a track converter in which each track works independently of the other so that a vehicle maintains mobility even if one track is lost.

It is still another object of this invention to provide a track link which can compress on one track link side at a time.

It is still a further object of this invention to provide a track drive converter useful for emergency vehicles, construction vehicles and recreational vehicles.

These and other objects will be more readily ascertainable to one skilled in the art from a consideration of the following Figures and exemplary embodiments.

BRIEF DESCRIPTION OF THE DRAWING(S)

FIG. 1 is a schematic side view of a vehicle with the invention installed.

FIG. 2 is an enlargement of the front wheel shown in FIG. 1 depicting the meshing of the teeth in the tire disc.

FIG. 3 is a cross section taken on lines 3—3 of FIG. 2 showing the wheel and disc alignment.

FIG. 8 is a top view of the track and tire taken on lines 8—8 of FIG. 1.

FIG. 9 is an isometric of a track tensioning assembly for the rear tires.

FIG. 12 is an top view taken on lines 12—12 of FIG. 10 and shows a wheel well with its channel to hold the slide arm of the track tensioning assembly.

DETAILED DESCRIPTION OF THE PREFERRED EMBODIMENT(S)

Figure 7:
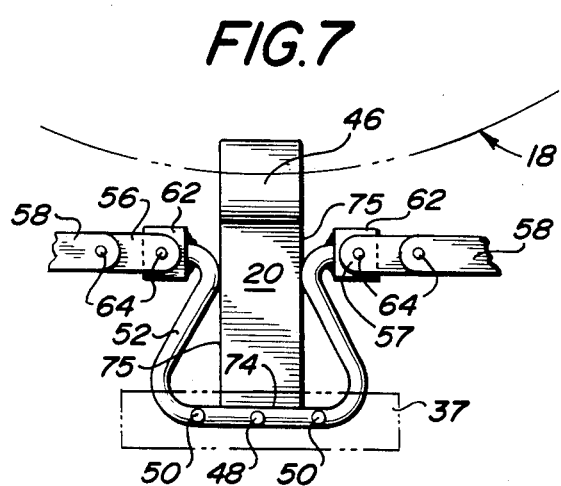
FIG. 7 is a side view of the chain link shown in FIG. 6 with the disc in phantom.

Referring now to the Drawings and more particularly to FIG. 1, the track drive converter 10 of this invention is shown on a vehicle 12. Track 14, with connectors 54, links 36, and pads 37, is placed over both tires 16 on one side of vehicle 12. The wheels of tires 16 have been fitted with wheel discs 18 which have indents 21 (seen in FIGS. 2 and 3) into which track drive teeth 20 mesh (drive teeth 20 and discs 18 are better shown with reference to FIGS. 2, 3, 4 and 5). Rollers 24 and 26 are positioned over track 14 and tension track 14, holding track 14 on tires 16.

It can be seen in FIG. 1 that track drive converter 10 is placed on a standard road vehicle. The advantage of this invention is that it is placed on any standard road vehicle with only roller assemblies (shown in FIGS. 9, 10 and 11) of rollers 24 and 26, discs 18 being installed on the vehicle itself. Track 14 is easily removed and compacted for storage.

Figure 5:
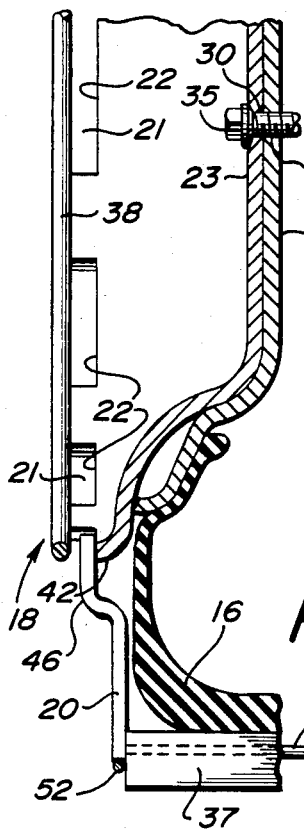
FIG. 5 is a partial enlargement taken on lines 5—5 of FIG. 2 showing drive tooth and disc in mesh.
Figure 4:
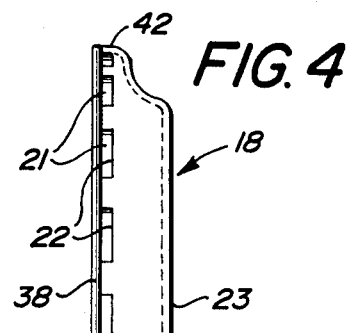
FIG. 4 is a cross section of the disc showing the disc indents.

Referring now to FIG. 2, an enlargement of wheel disc 18 is shown mounted on a tire 16. Disc 18 overfits the wheel of a car and is convex (as seen in FIGS. 4 and 5). Disc 18 is attached to wheel 28 (seen in FIG. 3) at disc center 23 with the vehicle's lugs 35. Disc 18 has been drilled to receive lugs 35 in lug holes 30. It may be seen that one lug, lug 34, is larger. The keying or enlarging of lug 34 and its lug holes on each disc 18 and wheel 28 assures proper placement and alignment of all discs 18.

In use, one disc 18 is placed on each side of wheel 28, enlarged or keyed lugs 34 aligned (in the 12 o'clock position in this view) to assure parallel alignment of indents 21. When all discs 18 are installed in identical positions on all tires of vehicle 12, proper meshing of teeth 20 of track 14 with indents 21 of disc 18 is assured.

Also seen in FIG. 2 is circular rod 38. As tire 16 turns in the direction of arrow 40, one drive tooth 20 on padded track link 36 meshes with each indent 21. Tooth 20 slips into indent 21 and pushes against disc 18 on the edge 22 of indent 21, and is prevented from slipping outward by rod 38. Although, for the purpose of clear illustration only a few teeth 20 and connectors 54 are shown meshing with disc 18, almost two-thirds of the tire's circumference is covered by meshed track at one time (as seen in FIG. 1).

In the preferred embodiment shown in FIG. 2, all track links 36 have a drive tooth 20. However, it is possible to place drive teeth on as few as one-half of the links 36 and still have sufficient mesh to provide track drive for the vehicle. Also, track links 36 have been shown padded with pad 37, as is preferred.

Referring now to FIG. 3, a cross section of wheel 28, discs 18 and tire 16 is shown. FIG. 3 demonstrates the importance of proper alignment of discs 18 on a wheel 28. One link 36 on track 14 is shown with tire 16 resting on link pad 37. Drive teeth 20, one on each end of link 36, are shown in mesh with disc indents 21. Indents 21 are seen to have edges 22 against which tooth 20 pushes. Indents 21 on each disc 18 are aligned by placing lugs 35 through lug holes 30 in disc 18 and holes 32 in wheel 28 so that both teeth 20 on a link will mesh in parallel positions on disc 18. Teeth 20 are held in indent 21 by rod 38.

Wheel 28 is seen with lug holes 32. When similar lug holes 30 in disc centers 23 are aligned with wheel 28 and with each other, and lugs 35 are inserted through both holes 30 and 32, both teeth 20 will be received into aligned indent 21 to cause smooth and even pick-up of track 14. Keying or enlarging of lug hole 34 assures consistent and proper alignment of teeth 20 with disc 18.

Referring now to FIG. 4, disc 18 is shown in cross section. It can be seen in FIG. 4 that disc 18 is dished, not flat. Dishing of disc 18 allows meshing of teeth 20 (seen in FIGS. 1, 2 and 3) with disc 18 at a distance from tire 16 (seen in FIG. 3). Although the center 23 of disc 18 is adjacent to wheel 28 for close fitting, disc extension 42 and indent 21 with edge 22 are held away from the wheel. Rod 38 is seen surrounding disc 18.

Now referring to FIG. 5, an enlargement shows meshing of teeth 20 and disc 18. Tire 16 is seen fitted to disc 18 at center 23 and to wheel 28 with lug 35 extending through lug hole 30 in disc 18 and lug hole 32 in wheel 28. Dished out are disc extensions 42 and indents 21. Tooth 20 has upper outward extension 46 which meshes with indent 21, touching edge 22, and held in place between rod 38 and disc extension 42. It can be seen that if tooth 20 were completely straight and disc 18 not dish-shaped, tooth 20 might scrape or puncture tire 16. Thus we see in FIGS. 4 and 5 both the meshing of teeth 20 and disc 18, and the importance of their respective shapes. Also seen in FIG. 5 is link pad 37 with track link central rod 48 in phantom (seen better in FIGS. 6 and 7).

Figure 6:
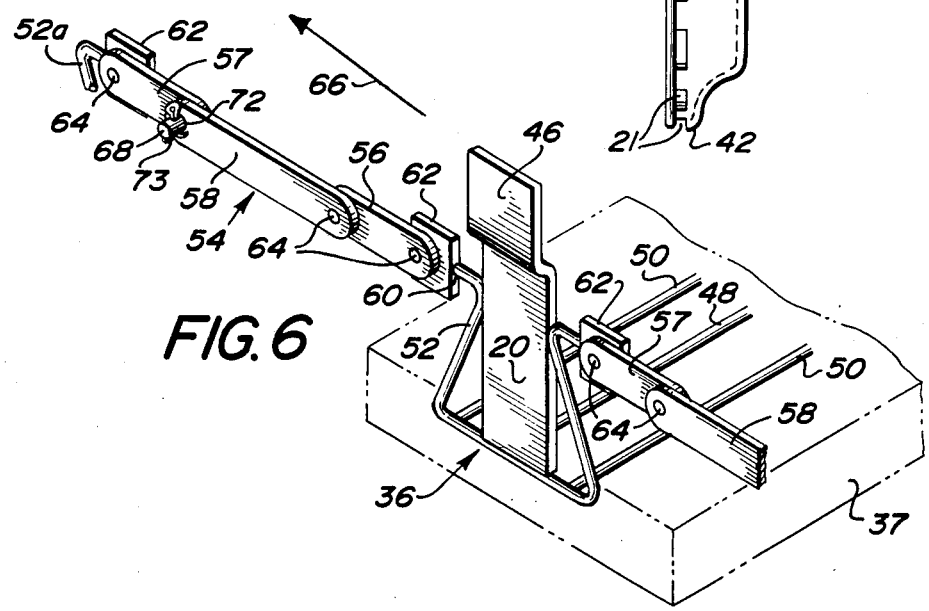
FIG. 6 is an isometric view of part of the track.

Now referring to FIG. 6, a fragmentary isometric view of a set of link 36 and connectors 54 of track 14 is shown. In FIG. 6, elastomeric pad 37 is shown in phantom to expose the elements of link 36. Pad 37 is elastomeric rather than solid steel, for example, to reduce the weight of track 14. Link 36 is composed of parallel rods 50 and 48 and brackets 52. Although the other end of link 36 is not shown, both ends of each rod 50 and 48 are attached to an omega-shaped bracket 52.

Also attached to bracket 52 is drive tooth 20 which has extension 46. At the other ends (not seen) of rods 50 and 48 is another bracket 52 and tooth 20 (not seen). Rods 50 and 48, and teeth 20, are preferably steel or light metal with suitable strength, and are permanently attached to their bracket 52 in exact alignment at each rod end. Thus, each drive tooth 20 on each rod end will mesh in alignment on each disc 18 on opposite sides of tire 16 (seen in FIG. 3).

Attached to ends 60 of bracket 52 are attachment plates 62. Pivotably attached by pin 64 to plates 62 is a first end connector bar 56. Each bar 56 is connected at one end to a plate 62 and on its other end to a second central connector bar 58. A third connector bar 57 is attached at one of its ends to the other end of bar 58 and at its other end to another connector plate 62. All bars are joined pivotably by pins 64 which allow bars 56, 57 and 58 to pivot independently of each other. Thus, if connectors 56, 57 and 58 all move in the direction of arrow 66, the link 36 (unseen), attached to bracket 52a, may touch link 36 at the end illustrated. At the same time, if connectors 56, 57 and 58 on link 36's other end (unseen) do not pivot but remain stretched out as seen in FIG. 6, the unseen end of link 36 will not touch its neighbors. It is this independent action of connector bars 56, 57 and 58 which provides for compression of links 36 necessary for turning of a vehicle. The compression of track 14 is best seen in FIG. 8.

Also seen in FIG. 6 is pin 68 with cotter pin 73. Not shown is a second pin 68 on the unseen portion of linkage joined to connector 57. Pin 68 is removable (unlike pins 64 which are permanent). When pins 68 are removed from connector bars 57 and 58, track 14 is no longer continuous and it may be removed from the vehicle. Cotter pin 73 prevents pin 68 from falling out during use.

When a person wishes to convert his vehicle to track drive, he lays out open track 14 and drives his vehicle onto it, aligning discs 18 and teeth 20 as explained in FIGS. 1, 2 and 3. He then brings track 14 up and around tires 16, attaching pins 68 into apertures 72 and placing cotter pin 73 into pin 68 to lock it in place. He then lowers roller assemblies 24 and 26 to track 14 as further explained in reference to FIGS. 9, 10 and 11. When a user wishes to convert back to wheel drive, he simply removes pins 68 from apertures 72 and drives off track 14. This easy removal and placement of track 14 is important to track drive converter 10 because it provides for prompt and easy conversion of a wheeled vehicle to track drive.

Thus, we have seen in FIG. 6, two important features of converter 10: first, the easy removal and placement of track 14 on a vehicle; second, the connectors 56, 57 and 58 which provide compressibility to track 14.

Now referring to FIG. 7, attachment of bracket 52 to rods 48 and 50 and tooth 20 is seen in cross section. Bracket 52 is seen attached at its ends (not seen) to plates 62. Plates 62 are pivotably attached to connector bars 56 and 57 by pins 64. It is seen that bracket 52 is also attached to rods 50 and 48. Additionally, it is seen that bracket 52 is welded to tooth 20 at tooth bottom edge 74 and tooth sides 75. Connecting bars 56 and 57 are each also joined by pins 64 to bars 58. Also seen in FIG. 7 in phantom are elastomeric pad 37 and wheel disc 18 in mesh with tooth extension 46.

Now referring to FIG. 8, track 14 is seen compressed for a turn, roller 24 (better shown in FIGS. 9, 10, 11 and 12) holding track 14 in curved configuration. Each track 14 is of a length to travel the greater distance required by a left tire making a right turn and a right tire making a left turn. Seen in FIG. 8, a front tire 16 is turning left. As tire 16 and wheel disc 18 press on links 36 of track 14, pressure from track 14 on roller extension 78 causes roller assembly 24 to slide to the right side. Tension of roller 24 on track 14 keeps track 14 on tire 16. It is the ability to readily compress which provides track drive converter 10 its flexibility and usefulness to the recreational user. Once a tensioning assembly and a track 14 are locked into place, they will react to any pressure placed on them by compression of track 14 and will respond to turns easily as shown in FIG. 8.

Also seen in FIG. 8 are links 36 connected by connectors 54. Pins 68 are seen on one connector 54, which, when removed, allow track 14 to be removed from the vehicle.

In order to provide constant tension and turning pressure to track 14, rollers 24 and 26 must be able to ride up and down with the track. The elements which provide this adjustability to rollers 24 and 26 are best explained in FIGS. 9, 10, 11 and 12.

Now referring to FIG. 9, an embodiment of track tensioning assembly 80 is seen as installed over a rear tire. Assembly 80 has roller 26 with extensions 78. Roller 26 achieves its rotatability by moving on pin 79 which extends the length of roller 26. Pin 79 is attached to holder 84. Roller 26 is attached to a hydraulic piston 82 also through roller holder 84. Extending from one end of piston 82 is adjustable rod 86 which is adjusted lengthwise by nut 104. From the other end of piston 82 extends arm 88 with bracket 90 at its end. Bracket 90 is attached to wheel well wall 93. As track 14 moves up and down due to vehicular movement, track tensioning assembly 80 keeps tension on track 14 by the responsive action of piston 82.

Also seen in FIG. 9 is roller hinged arm 94 with hinge 96 and bracket head 98. Arm 94 is also attached to wheel well wall 93 at one end and piston 82 at its other end. Arm 94 provides hinge 96 to allow track tensioning assembly 80 to be folded up into wheel well 93 when track converter 10 is not in use and to be locked into position when a track 14 has been put in place.

To put track tensioning assembly 80 into use, a user follows the procedure described in FIG. 6 to place track 14 in position. The user then lowers track tensioning assembly 80 over the rear tires. Fixed nut 104 is turned, causing rod 86 to extend, causing rollers 26 to come in contact with links 36, exerting downward pressure on links 36 of track 14 and taking up any slack in the system. Roller 26 and assembly 80 are locked into position by hinge lock 96.

Track tensioning assembly 80 is the assembly used for the rear tires. The assembly for a front tire is explained in FIGS. 10, 11 and 12.

Figure 10:
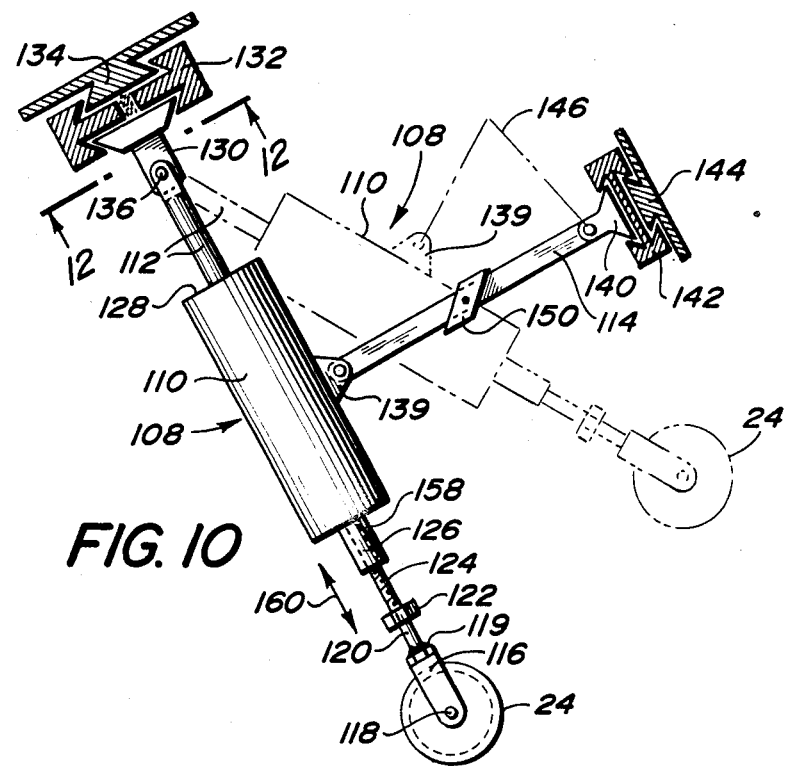
FIG. 10 is the preferred embodiment of the track tensioning assembly adapted for the front tires.

Now referring to FIG. 10, the preferred embodiment of track tensioning assembly 108 for a front tires is seen. Assembly 108 is seen to include roller 24, piston 110, arm 112 and hinged arm 114. Roller 24 is held by clamp holder 116 through pin 118. Pin 118 runs lengthwise through roller 24 and is fastened at both ends to holder 116, providing rotatability to roller 24.

Attached to clamp holder 116 is swivel joint 119. Swivel joint 119 allows roller 24 to swivel on rod 120 as the track moves. Rod 120 is threaded at its other end, adjustment of threads 124 achieved by turning nut 122. Rod 120 threads into piston 110 through interiorly threaded cylinder 126. Sleeve 158 is the section of piston 110 which moves in the direction of arrow 160 to provide hydraulic action. Lengthwise adjustment of rod 120 is necessary to allow track tensioning as explained in reference to rod 86 in FIG. 9. Piston 110 provides adjustable tension to track 14 by supplying constant pressure to roller 24. Since roller 24 and tensioning assembly 108 are locked into position, they react to any external pressure applied to them as explained in reference to FIG. 8.

Referring specifically to arm 112, it is seen in FIG. 10 that arm 112 is preferably a flat bar attached at one end to top 128 of piston 110. A weld or any secure fastening means may be used to fasten arm 112 to piston 110. The other end of bar 112 is fastened to slide arm 130 by bolt 136. Slide arm 130 slides in slide arm mount 132 (as seen in FIG. 12). Slide mount 132 slides in channel 134 (also seen in FIG. 12).

Also seen in FIG. 10 is hinged arm 114 with hinge 150. As with tensioning assembly 80, hinge 150 provides a means for locking assembly 108 into place or storing it above the tire in wheel well 93 when device 10 is not in use. Arm 114 is attached by bracket 139 to the outside wall of piston 110. At the other end of arm 114, a slide arm 140 is attached. Slide arm 140 rides in slide arm mount 142 which itself rides in channel 144. Hinged arm 114 is urged upward in the position, indicated by lines 146, to hold track tensioning assembly 108 away from the wheel (as seen in phantom) when track drive converter is not in use.

Figure 11:
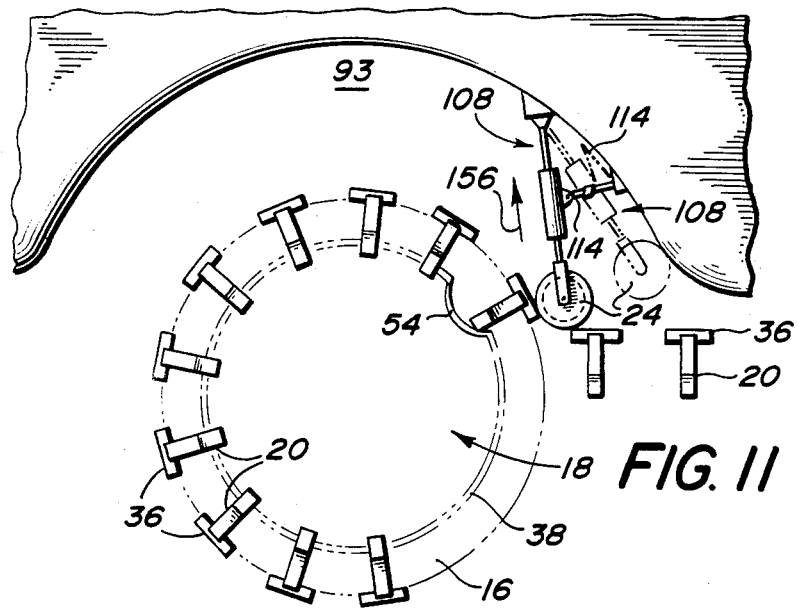
FIG. 11 is a side view showing the track tensioning assembly of FIG. 10 in place.

Now referring to FIG. 11, track tensioning device 108 is seen locked in place in wheel well 93 of vehicle 12. A fragment of track 14 is shown having links 36, connectors 54, drive teeth 20, and disc 18, shown with circular rod 38. As tire 16 rotates, roller 24 presses down on track 14, spanning the space between two links 36 and touching both links 36 to maintain constant and smooth contact with track 14. Track tensioning device 108 is shown again in phantom with arm 114 angled upwards to illustrate the position assembly 108 assumes when the track converter is not in use.

Also seen in FIG. 11 is the direction (shown by arrow 156) in which piston 110 absorbs movement of roller 24. As a vehicle turns, track 14 raises in the direction of arrow 156 to allow for the lengthening of track 14. Roller 124 must move in the direction of arrow 156 to keep constant pressure on track 14 so that roller edges 78 (seen in FIGS. 8 and 9) continue to hold track 14 between them. After a turn is completed, track 14 and roller 24 assume the positions shown in FIG. 11.

Now referring to FIG. 12, slide arm 130 is seen inside slide arm mount 132. Also seen are pins 154 on mount 132 and spring 152 attached to wheel well 93 (attachment not shown). Slide arm 130 is able to slide in mount 132 until it touches a set of pins 154. When it touches pins 154 (as seen in phantom), slide arm mount 132 is urged to move. Mount 132 is able to move the complete length of and beyond channel 134. When a vehicle is urged into a sharp turn and tires 16 assume a position where a portion of tire 16 extends out of wheel well 93, mount 132 may move through channel 134 as seen in phantom. When mount 132 moves in channel 134, spring 152 holds it in position and pulls mount 132 back into the position illustrated when the turn is completed. In FIG. 12, the mounting of bracket 130 is shown as for a right tire 16. When a bracket 130 is mounted on a front left tire wheel well 93, spring 152 is attached to the opposite end of bracket mount 132.

Thus, in FIGS. 8, 9, 10, 11 and 12 it is seen that track tensioning assemblies 80 and 108 hold track 14 onto tires 16 during turns, as well as during straight driving. Moreover, roller 24 actually turns with track 14 as seen in FIG. 8. The combined flexibility of track 14 and the adjustability of track tensioning assembly 108 are the key features of this invention which make this track converter simple to produce, install and use on any model vehicle.

There are many variations which may be practiced within the scope of this invention. Each link 36 may have a drive tooth 20, or only selected links may have drive teeth. Pads 37 may be rubber, treaded rubber or any shock absorbing material and still be within the scope of this invention.

Although hydraulic pistons are preferred, springs may be substituted to allow for tensioning.

There are many advantages to the track drive converter of this invention. First, this converter works on conventional vehicles. It is easily installed, requiring few permanent additions to the vehicle. The track is portable, lightweight, and compresses to about one-half its length for storage. It may also be folded or rolled up to further reduce the area required for storage and portability.

The track drive converter of this invention is applicable to commercial and recreational vehicles. It provides a means for vehicles to climb, span a trench, have traction in bad road conditions, and travel over rough terrain.

The track drive converter of this invention uses the vehicle's own steering system to steer the track. The track itself is extremely flexible and easily guided by the wheels and rod 38.

The track drive converter of this invention has tracks which operate independently of each other so that a vehicle maintains mobility even when one track is lost.

Having now illustrated and described my invention, it is not my intention that such description limit the invention, but that the invention be limited only by a reasonable interpretation of the appended claims.

What is claimed is:

1. An apparatus to convert a standard wheel drive vehicle into a track drive vehicle comprising:
   (a) a removable continuous track intended to be used as a pair, sized to overfit and span both in width and length a set of wheels comprising a rear and front wheel on the same side of a vehicle including the vehicle's tires, said track including:
   (i) a plurality of elongated track link sets, each sets having two ends and two sides,
   said track link sets each including three generally equally-sized, parallel rods, two omegashaped end brackets, each bracket including attachment plates, one on each bracket end, one bracket at each link set end positioned in a plane perpendicular to said rod ends with said center rod's ends attached to the midpoint of the curve of said brackets and said side rods'ends attached to opposing points on said brackets' sides, said brackets being movably and compressably joined to each other by connectors through said attachment plates at each end of each said bracket, preselected links including drive teeth, one said tooth located at and perpendicular to each end of each of said preselected link sets proximate said set's end midpoint; and,
   (ii) a set of connectors, one at each track link end;

(b) a generally circular wheel disc used as a set of two and mounted one on each side of each of said vehicle wheels, said disc diameter being presized to radially receive said teeth, each disc set aligned in parallel planar juxtaposition with its set member, said disc including at its periphery a plurality of equally spaced-apart indent means to receive and mesh with said drive teeth which lie adjacent to it; and, (c) a track tensioning assembly mounted on said vehicle in working relationship with said track, so that when a track is placed over and around a set of wheel mounted tires and said drive teeth are meshed with said disc set, said apparatus thereby converts wheel drive to track drive for said vehicle.

2. The track drive converter according to claim 1 wherein said connector comprises a set of three end-to-end, first, second and third movably connected, contiguous bars, said bars each including at each bar's end means to receive pins, said first bar movably connected at its first end by a pin to said attachment plate on one of said end brackets, said second bar longer than said first bar to allow said bars to assume a configuration which allows said link ends to compress, said second bar movably attached by pins at each of its ends, one end to said first bar's other end and said second bar's other end to a first end of said third bar, said third bar being of a length equal to said first bar, said third bar being movably attached by a pin at its other end to said attachment plate of said second end bracket, said pins allowing jointed but independent movement of said bars so that one link end will compress with its adjacent link while said other link end remains apart from said adjacent link, such compression allowing said track to be turned in use.

3. The track drive converter according to claim 2 including, additionally, at least two modified connectors attached to opposing ends of one of said links, one connector on each side of said track, said modified connectors each including one detachable pin so that when said detachable pin is removed from said connector, said track opens to facilitate said track's placement on said vehicle.

4. The track drive converter according to claim 1 wherein said track tensioning roller assembly comprises:

(a) at least one cylindrical roller, said roller adjustable and positioned on said vehicle's underside above a portion of said tires and touching said track, said roller including a clamp holder pivotably attached at said roller's ends, said roller also including at its ends circumferential lips, each roller's length exceeding said track's width so that said roller's lipped end extends beyond said track sides to aid in holding said track on said tires;

(b) a hydraulic piston-cylinder arrangement, said piston cylinder arrangement including a cylinder and a piston rod extending through and out a first cylinder end, said rod's first end pivotably attached to said roller's holder by a swivel bracket, said piston rod's other end adjustably mounted in said cylinder; and, (c) a slide arm having two ends, a first end attached to said piston rod's other end, said slide arm's second end attached to said vehicle's underside, so that said roller assembly provides adjustable and constant tension to said track, holding said track firmly on said tires.

5. The track drive converter according to claim 4 wherein there are four tensioning rollers and wherein each said roller is sized to span and touch at least two of said links at all times to prevent said roller from wedging itself between two links and to minimize hydraulic action of said piston.

6. The track drive converter according to claim 4 wherein said track tensioning assembly includes, additionally, a channel in said vehicle's underside, said channel including means to slidably receive said slide arm so that as said wheel turns, said slide arm moves in said channel, allowing said roller to follow said wheel, turning said track with said wheel.

7. The track drive converter according to claim 6 wherein said means in said channel to receive said slide arm includes:

(a) walls in said channel, said walls adapted to receive a slide arm mount, said channel being open at both ends;

(b) a C-shaped slide arm mount, said slide arm mount adapted to receive said slide arm end, said mount slidably mounted in said channel, said mount also including pins proximate its ends to inhibit the movement of said slide arm; and (c) at least one spring, one end attached to an end of said slide arm mount, said spring's other end attached to said wheel well, so that when said vehicle makes a sharp turn, said slide arm mount will slide beyond said channel's open end to allow said roller to follow said turn, said mount pulled back into said channel by said spring when the turn is completed.

8. The track drive converter according to claim 6 wherein said track tensioning assembly's piston-cylinder arrangement includes, additionally, a hinged arm, a first end of said hinged arm attached to an outer wall of said cylinder proximate said cylinder's lengthwise midpoint, said hinged arm's second end slidably mounted to said vehicle's underside, said hinged arm also including a hinge proximate said hinged arm's midpoint, said hinge folding only in the direction of said vehicle's underside, said hinge thus providing means to fold said roller assembly out of the way when said track converter is not in use.

9. The track drive converter according to claim 8, wherein said track tensioning assembly includes a second channel on said vehicle's underside, said second channel sized to receive said hinged arm's second end so that said hinged arm slides in said second channel when said vehicle is turned.

10. The track drive converter according to claim 8, wherein said track tensioning assembly includes, additionally:

(a) a second channel, said second channel having open ends and positioned to receive said hinged arm;

(b) said hinged arm having a mount sized to receive said second end of said hinged arm, said hinged arm mount slidably mounted in said second channel, said hinged arm mount also including pins proximate its ends, said pins limiting movement of said hinged arm; and, (c) at least one spring, one end of said spring attached to an end of said hinged arm mount, said spring's other end attached to said second channel, so that when said vehicle makes a sharp turn, said hinged arm mount will slide beyond said second channel's open end to allow said roller to follow the turn, said hinged arm mount pulled back into said second channel by said spring when the turn is completed.

11. The track drive converter according to claim 1 wherein the width of said links is equal to the distance between said links.

12. The track drive converter according to claim 1 wherein one of said openings in said wheel disc is key-shaped to receive a mated key-shaped lug, said key-shaped lug positioned identically on each wheel disc so that when said wheel discs are placed on said wheels with said key-shaped opening in identical position on each of said wheels, proper alignment of said indent means to receive said track teeth occurs.

* * * * *